United States Patent
Hailpern et al.

(10) Patent No.: US 10,754,984 B2
(45) Date of Patent: Aug. 25, 2020

(54) PRIVACY PRESERVATION WHILE SHARING SECURITY INFORMATION

(71) Applicant: ENTIT Software LLC, Sunnyvale, CA (US)

(72) Inventors: Joshua Hailpern, Sunnyvale, CA (US); Tomas Sander, Princeton, NJ (US)

(73) Assignee: Micro Focus LLC, Santa Clara, CA (US)

( * ) Notice: Subject to any disclaimer, the term of this patent is extended or adjusted under 35 U.S.C. 154(b) by 189 days.

(21) Appl. No.: 15/766,137

(22) PCT Filed: Oct. 9, 2015

(86) PCT No.: PCT/US2015/054989
§ 371 (c)(1),
(2) Date: Apr. 5, 2018

(87) PCT Pub. No.: WO2017/062038
PCT Pub. Date: Apr. 13, 2017

(65) Prior Publication Data
US 2018/0300504 A1    Oct. 18, 2018

(51) Int. Cl.
*G06F 21/62* (2013.01)
*G06F 16/9535* (2019.01)
(Continued)

(52) U.S. Cl.
CPC ...... *G06F 21/6254* (2013.01); *G06F 16/9535* (2019.01); *G06F 21/316* (2013.01); *G06F 21/34* (2013.01); *G06F 21/6263* (2013.01)

(58) Field of Classification Search
CPC ............. G06F 21/6254; G06F 16/9535; H04L 63/0407; H04L 63/1433; H04L 63/14
See application file for complete search history.

(56) References Cited

U.S. PATENT DOCUMENTS 8,176,078 B1 * 5/2012 Singer ............... G06Q 10/00
707/783
8,504,486 B1   8/2013 Pinto
(Continued)

FOREIGN PATENT DOCUMENTS

EP         2738708 A1    6/2014
WO    WO2013147889      10/2013

OTHER PUBLICATIONS

Chismon, D., et al., Threat Intelligence: Collecting, Analysing, Evaluating, Mar. 20, 2015, MWR InfoSecurity, 36 pages.
(Continued)

*Primary Examiner* — Ellen Tran

(57) ABSTRACT

In some examples, a method of privacy preservation in a security information sharing platform includes comparing, by a system comprising a hardware processor in the security information sharing platform that enables sharing of security information among a plurality of users, a set of profiles wherein each profile of the set of profiles is associated with an individual user; identifying, by the system based on the comparing, that a badge associated with a particular profile of the set of profiles is predictive of an identity of the individual user, the badge based on a contribution of security information by the individual user to the security information sharing platform, and the badge comprising user attributes associated with the individual user; and modifying, by the system based on the identifying, a visibility of the badge within the security information sharing platform.

18 Claims, 3 Drawing Sheets

(51) Int. Cl.
*G06F 21/31* (2013.01)
*G06F 21/34* (2013.01)

(56) References Cited

U.S. PATENT DOCUMENTS

| | | |
|---|---|---|
| 8,631,489 B2 | 1/2014 | Antonakakis et al. |
| 8,667,583 B2 | 3/2014 | Polyakov et al. |
| 8,813,228 B2 | 8/2014 | Magee et al. |
| 8,850,588 B2 | 9/2014 | Kumar et al. |
| 9,009,321 B2 | 4/2015 | Alperovitch et al. |
| 9,009,827 B1 | 4/2015 | Albertson et al. |
| 9,015,846 B2 | 4/2015 | Watters et al. |
| 9,495,062 B1 | 11/2016 | Reiner |
| 2002/0038430 A1 | 3/2002 | Edwards et al. |
| 2003/0005193 A1 | 1/2003 | Seroussi et al. |
| 2003/0126470 A1 | 7/2003 | Crites et al. |
| 2006/0294388 A1 | 12/2006 | Abraham et al. |
| 2010/0100956 A1 | 4/2010 | Fusari |
| 2011/0225650 A1 | 9/2011 | Margolies et al. |
| 2011/0256521 A1 | 10/2011 | Mansfield |
| 2012/0110633 A1 | 5/2012 | An et al. |
| 2012/0130863 A1 | 5/2012 | Tedjamulia et al. |
| 2012/0151569 A1 | 6/2012 | Farsedakis |
| 2012/0233098 A1 | 9/2012 | Schwoegler |
| 2012/0246730 A1 | 9/2012 | Raad |
| 2013/0086484 A1 | 4/2013 | Antin et al. |
| 2013/0179679 A1 | 7/2013 | Broustis et al. |
| 2013/0204664 A1 | 8/2013 | Romagnolo et al. |
| 2014/0007190 A1 | 1/2014 | Alperovitch |
| 2014/0201836 A1 | 7/2014 | Amsler |
| 2014/0212112 A1 | 7/2014 | Håff |
| 2014/0304182 A1 | 10/2014 | Kurien et al. |
| 2015/0046990 A1 | 2/2015 | Oberheide et al. |
| 2015/0172311 A1 | 6/2015 | Freedman et al. |
| 2015/0277953 A1 | 10/2015 | Xu |
| 2016/0127899 A1 | 5/2016 | Jabara |
| 2016/0162690 A1 | 6/2016 | Reith |
| 2016/0292375 A1 | 10/2016 | Gegner |
| 2016/0301203 A1 | 10/2016 | Curry |
| 2016/0305343 A1 | 10/2016 | Morgan |
| 2016/0364126 A1 | 12/2016 | Li |
| 2017/0026332 A1 | 1/2017 | Loa |
| 2017/0032394 A1 | 2/2017 | Stevens |
| 2017/0064020 A1 | 3/2017 | Obukhov |
| 2018/0046502 A1 | 2/2018 | Zimmer |
| 2018/0205814 A1 | 7/2018 | Bron |
| 2018/0255104 A1 | 9/2018 | Sander |
| 2018/0288085 A1 | 10/2018 | Hailpern |

OTHER PUBLICATIONS

International Search Report and Written Opinion dated Jul. 8, 2016, PCT Patent Application No. PCT/US2015/054989 dated Oct. 9, 2015, Korean Intellectual Property Office, 10 pages.

Scekic, O,. et al, Incentives and Rewarding in Social Computing, Jun. 2013, Communications of the ACM, vol. 56, No. 6, 11 pages.

Barnum, S., Standardizing Cyber Threat Intelligence Information with the Structured Threat Information eXpression (STIX™), May 30, 2013, The NITRE Corporation, Retrieved from the Internet: <https://stix.mitre.org/about/documents/STIX_Whitepaper_v1.0.pdf> [retrieved on Jun. 18, 2015], 20 pages.

Microsoft Corporation, Microsoft Advanced Threat Analytics, May 4, 2015, Retrieved from the Internet: <http://www.microsoft.com/en-us/server-cloud/products/advanced-threat-analytics/> [retrieved on Jun. 24, 2015], 15 pages.

* cited by examiner

PRIVACY PRESERVATION WHILE SHARING SECURITY INFORMATION

CROSS REFERENCE TO RELATED APPLICATION

This application is related to International Appl. No. PCT/US2015/054961, filed Oct. 9, 2015, of which U.S. application Ser. No. 15/765,944 is a PCT national stage application, the entire specification of which in incorporated wherein by reference.

BACKGROUND

Users of a security information sharing platform share security information, such as security indicators, threat actors, malware samples, and attack campaigns, with other users in an effort to advise the other users of any security threats, as well as to gain information related to security threats from other users.

DETAILED DESCRIPTION

Figure 1:
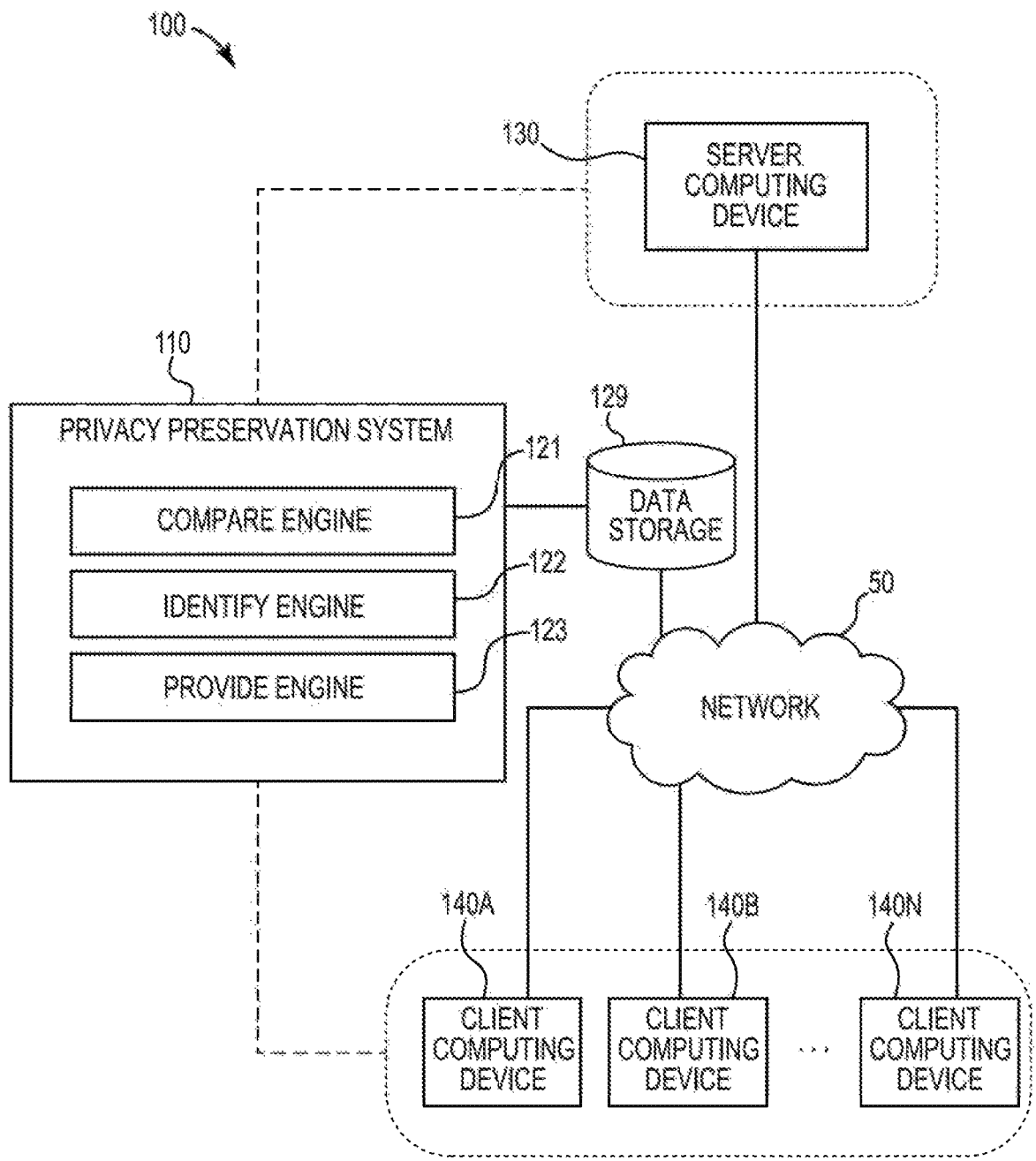
FIG. 1 is a block diagram depicting an example environment in which various examples may be implemented as a privacy preservation system in a security sharing platform.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Information to be shared within a security information sharing platform may be created or validated by human security analysts. For example, higher level intelligence, such as descriptions of threat actors' motives, tools, techniques and procedures, and potential targets, may include human analysis to both produce and consume. This type of contextual intelligence may be valuable to a security analyst because it has been validated by another analyst, is related to important security events, and is more comprehensive than lower level intelligence, thus allowing an analyst to better respond to threats.

As some of the most valuable information shared within the security information sharing platform may include human interaction, it may be beneficial for users of the security information sharing platform to not only participate in the platform but to contribute information and data. Additionally, as the security information sharing platform includes information and security threats, a user may want to remain anonymous so that a particular vulnerability cannot be traced back to his or her company. Therefore, it may be beneficial for contributions by a user to remain anonymous.

Users of a security information sharing platform may share security information, such as security indicators, threat actors, malware samples, and attack campaigns, among other types of security information, with other users in an effort to advise other users of any security threats, as well as to gain information related to security threats from other users. The other users with whom the security information is shared may belong to a community that the user selects for sharing, or to the same community as the user. The other users of such communities may further share the security information with other users or communities. A "user," as used herein, may include an individual, organization, or any other entity that may send, receive, or share security information. A community may include a plurality of users. For example, a community may include a plurality of individuals having a common interest. A community may include a global community where any user may join, for example, via subscription. A community may also be a vertical-based community. For example, a vertical-based community may be a healthcare or financial community. A community may also be a private community with a limited number of selected users. The community may include a number of sub-communities. A sub-community may be a portion of the community that shares some common characteristic. For example, a sub-community may be a portion of the community belonging to a particular group, interested in a particular topic, self-segregated into a private/semi-private set of users, belonging to a group with specific-unique permissions, belonging to a group which frequently share security information among the group, etc. The sub-community may be defined as a group and treated uniquely with regard to a portion of their security information sharing within the security information sharing platform.

A "security indicator," as used herein, may refer to a detection guidance for a security threat or vulnerability. In other words, the security may specify what to detect to or look for, also known as an observable, and what detection of a particular observable means. For example, the security indication may specify a certain Internet Protocol (IP) address to look for in the network traffic. The security indicator may include information that the detection of the IP address in the network traffic can indicate a certain malicious security threat, such as a Trojan virus. An "observable," as used herein, may refer to an event pertinent to the operation of computers and networks, including an event occurring in network, servers, applications, and desktops. Examples of an observable include an IP address, an email address, and a domain name. A security indicator may compromise a single observable or a plurality of observables.

A security indicator may be created by or originated from at least one of a plurality of source entities. For example, the plurality of source entities may include a user, such as an analyst or community member of a security information sharing platform. A security indicator may be manually created and added to the platform by the user. In another example, the plurality of source entities may include a threat intelligence provider that provides threat intelligent feeds. A security indicator that is found in the intelligence feeds may be provided by independent third parties. There exist a number of providers of threat intelligence feeds. The threat intelligence feeds may be provided by independent third parties such as security service providers. The providers or sources may supply the threat intelligence feeds that provide information about threats the providers have identified. Most threat intelligence feeds include, for example, lists of domain names, IP addresses, and URLs that various providers have classified as malicious, or at least suspicious, according to different methods and criteria. Other examples of source entities may include, but are not limited to, government sources and open source feeds.

Users of the security information sharing platform may be recognized for their contribution to the security information sharing platform. For example, users may be assigned a badge or a plurality of badges to acknowledge contributions the user has made. A badge, as used herein, refers to a textual, visual, or other recognizable pattern that distinguishes a user of a security information sharing platform. Badges may be associated with unique user attributes, such as expertise, seniority, and contributions. These attributes may be thought of as fine-grained properties associated with a user, such as personal achievement within the security information sharing platform, identification of particular security threats, among other examples discussed further herein. Since badges measure fine-grained properties, they may convey information that is different than the information conveyed by a reputation score. The visibility of portions of the profile may be determined based on user preferences, system settings, and/or other factors.

The badges and other information related to a user may be associated with a profile. A "profile," as used herein may include a collection of information about a corresponding user and/or the accomplishments and contributions of the user within the security information sharing platform. The profile may include profile elements. A "profile element," as used herein may include units of information about the user. The profile and the profile elements may include information that is designed to communicate characteristics of the user and user contributions in an anonymous manner. That is, the profile and profile elements may include information that is descriptive of characteristics of the user and/or the user's contributions without being intentionally descriptive of an identity (e.g., name, employer, corporate identity, location, etc.) of the user. The profile elements may be individual units of information such as a badge. Alternatively, the profile elements may be a set of information such as a set of badges.

A portion of the profile and/or its component profile elements may be visible. A "visible" portion of a profile, as used herein, may include a portion of the profile that is able to be observed by other users of the plurality of users of the security information sharing platform. The portion of the profile may be visible to all of the other users and/or a portion of the other users. For example, a first portion of the profile may be visible to the entire community within the security information sharing platform, whereas a second portion of the profile may be visible only to a sub-community. That is, the visibility of a given portion of the profile may be context-specific within the security information sharing platform. Additionally, the visibility of a portion of the profile can be modified by publicizing the portion to a portion of the plurality of users of the security information sharing platform in response to the occurrence of various events.

A portion of the profile and/or its component profile elements may be visible as tags associated with a contribution of a user to the security information sharing platform. A "tag," as used herein may include an observable indication (e.g., observable by other users of the plurality of users of the security information sharing platform), associated with a contribution to the security information sharing platform, of a profile element present in a profile corresponding to the user that made the contribution. The tag may include a graphical, text, or any other observable indication that may be viewed in association with a contribution that communicates to a user viewing the contribution characteristics of the contributor. In an example, a tag may communicate to a contribution of security information by a user that the contributing user has achieved a performance objective associated with a badge by displaying an indication of the badge alongside a listing of the contribution. In this manner, a user can ascertain a level of expertise of a contributing user and/or a validity, veracity, and/or general trustworthiness of the contribution based on an expertise of the user. A tag may directly correspond to a badge, acting as an indication of the assignment and/or existence of the corresponding badge in a corresponding profile.

Utilizing profiles, profile elements, badges, tags, etc. may communicate information that is inadvertently predictive of an identity of a user associated with those things. Unique profile elements, badges, tags and/or combinations thereof may create by inference and/or a process of elimination a prediction of the identity of a user. Providing a prediction of the identity of a user counteracts a key objective of utilizing badges to preserve anonymity of the user. Further, preservation of the privacy of contributors to a security information sharing platform may be a key element for continued incentivizing for contributions. Therefore, providing a prediction of a user's identity may counteract a key objective of encouraging user contributions.

Predicting a user's identity may be detrimental to the user. For example, a contribution of a security indicator can be associated with an identity of a contributing user once that contributing user's identity is predicted. A contribution of a security indicator may reveal vulnerabilities, attacks, security strategies, etc. associated with that user based on the context of the contribution. For example, a contribution indicating an IP address of a hacker and an exploited vulnerability involved in a hack of a corporate database where customer identification data was stolen may be associated with a particular corporation if that corporation's identity is predicted by a profile, profile elements, badges, tags, etc. associated with the contribution. Revelation of such an incident may have negative consequences for the corporation. For example, such a revelation may expose the corporation to increased regulatory scrutiny, further exploitations of the vulnerability, negative publicity, financial consequences, and/or reputation damage.

Examples of the current disclosure include examples that preserve the privacy of users within a security information sharing platform while simultaneously preserving the gamification reward, recognition, and discriminator strategies that encourage user contribution to the platform. Examples included herein include comparing a set of profiles wherein each profile is associated with an individual user, identifying whether a badge associated with a particular profile is predictive of an identity of a user associated with the particular profile, and modifying a visibility of the badge within the security information sharing platform.

The terminology used herein is for the purpose of describing particular embodiments only and is not intended to be limit. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening element, unless otherwise indicated. Two elements can be coupled mechanically, electrically, or communicatively linked through a communication channel, pathway, network, or system. It will also be understood that, although the terms first, second, third, etc. may be used herein to describe various elements, these elements should not be limited by these terms, as these terms are only used to distinguish one element from another unless stated other or the context indicates otherwise. As used herein, the term "includes" means includes but not limited to, and the term "including" means including but not limited to. The term "based on" means based at least in part on.

FIG. 1 is an example environment 100 in which various examples may be implemented as a privacy preservation system 110. Privacy preservation system 110 may include a server computing device 130 in communication with client computing devices 140A, 140B . . . 140N via a network 50. The client computing devices 140A, 140B . . . 140N may communicate requests to and/or receive responses from the server computing device 130. The server computing device 130 may receive and/or respond to requests from the client computing devices 140A, 140B . . . 140N. Client computing devices 140A, 140B . . . 140N may be any type of computing device providing a user interface through which a user can interact with a software application. For example, client computing devices 140A, 140B . . . 140N may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While the server computing device 130 can be a single computing device, the server computing device 130 may include any number of integrated or distributed computing devices.

The various components (e.g., data storage 129, server computing device 130, and/or client computing devices 140A, 140B . . . 140N) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, privacy preservation system 110 and the various components described herein may be implemented in hardware and/or a combination of hardware and programming that configures hardware. Furthermore, in FIG. 1 and other Figures described herein, different numbers of components or entities than depicted may be used.

Privacy preservation system 110 may comprise a compare engine 121, an identify engine 122, a provide engine 123, and/or other engines. The term "engine," as used herein, refers to a combination of hardware and programming that performs a designated function. As is illustrated with respect to FIG. 2, the hardware of each engine, for example, may include one or both of a processor and a machine-readable storage medium, while the programming is instructions or code stored on the machine-readable storage medium and executable by the processor to perform the designated function.

Compare engine 121 may compare, in a security information platform that enables sharing of security information among a plurality of users, a set of profiles. As discussed above, the profiles may be associated with an individual user and/or group of users. The individual user may, as described above, include an individual person, a plurality of persons, a business, a plurality of businesses, an organization, a group of organizations, etc.

Comparing the profiles may include comparing profile elements of the profiles. For example, comparing the profile elements may include comparing badges associated with the profile. Comparing the profile elements may also include comparing tags associated with contributions of the user. The tags may be generated based on the contents of the profile and/or may be a content of the profile.

Comparing the set of profiles and/or the associated profile elements may include comparing each of the profiles and/or associated profile elements to one another, to portions of the set of profiles, to the entire set of profiles, and/or to threshold values. Comparing the set of profiles may include performing a patter mining analysis across the sets of profiles and/or their corresponding profile elements. Performing a patter mining analysis may include mathematically identifying statistically relevant patterns among the sets of profiles. Performing pattern mining analysis may include mathematically identifying substantially unique profile characteristics among the sets of profiles and/or mathematically identifying substantially prevalent profile characteristics among the sets of profiles. Profile characteristics may include a profile element, a timing of a modification of a profile element, a group of profile elements, a tag associated with a contribution from a user associated with the profile, etc. A substantially unique profile characteristic may be a profile characteristic that contrasts with profile characteristics of other profiles and/or contrasts with characteristics of other uses. The substantially unique profile characteristics may include profile characteristics that contrast among the profile set such that it tends to predict to the plurality of users an identity of a user that the profile is associated with.

Identify engine 122 may identify, based on the comparison performed by the compare engine 121, a profile element of a particular profile that is predictive of an identity of a user associated with the particular profile. Identifying the profile element based on the comparison may include identifying the profile element based on an amount of profiles in the security sharing platform that include a similar and/or substantially identical profile element falling below a threshold amount (e.g., users with profiles including the similar and/or substantially identical profile elements leaving the platform). For example, the comparison may yield an amount of profiles (e.g., an amount of profiles in the security information sharing platform, amount of profiles in a community, amount of profiles in a sub-community, etc.) that have a badge associated with them (e.g., assigned to them) that is similar and/or substantially identical to a particular badge associated with the particular profile. That is, a prevalence of a badge, a badge type, and/or a set of badges across the set of profiles may be determined and expressed as an amount of the badge among the set of profiles.

A threshold amount associated with the badge may be determined. A threshold amount associated with the badge may include a threshold amount of assignments to and/or instances of a similar and/or substantially identical badge among the profiles associated with other users. The threshold amount may be an amount of assignments and/or instances of badges at or beyond which it is determined that the badge is not predictive of an identity of an associated user. The threshold determination may be a pre-determination based on the following relationship: the higher the number of assignments and/or instances of a badge in the security information sharing platform, the less likely that a single assignment and/or instance of the badge is unique enough to be predictive of an identity of an associated user. The threshold amount may be an amount of assignments and/or instances of badges below which it is determined that the badge is predictive of the identity of an associated user. The threshold determination may be a pre-determination based on the following relationship: the lower the number of assignments and/or instances of a badge in the security information sharing platform, the more likely that a single assignment and/or instance of the badge is unique enough to be predictive of an identity of an associated user. For example, if only a single instance of the badge exists in the platform and the badge is assigned to a single profile of a user, then the badge is highly predictive of the identity of the user. Therefore, when an amount of assignments and/or instances of a badge among the set of profiles of the security information sharing platform falls below the threshold amount, the badge may be identified as a profile element of the particular profile to which it is assigned, that is predictive of the identity of a user associated with the particular profile.

In some examples, the identified profile element may include a tag for an anonymous contribution to the security information sharing platform. For example, users of the security information sharing platform may contribute security information as described above. Further, as described above, these contributions may be anonymous, but they may be tagged. The tag may be based on the profile associated with the user. In some examples, the tag may be derived directly from the profile elements and/or the tag may be a profile element itself. The tag may be an indication such as a textual and/or graphical communication that is publically visible and that communicates an assignment and/or existence of a corresponding badge in a user profile. That is, a tag may be an indication of a particular badge that can accompany such things as a contribution by a user. A tag of a contribution of a user may communicate to observers of the contribution that the contributor possess a specific badge. In this manner, a tag may quickly communicate that the contributor likely possess a requisite amount of skill and/or expertise and that the trustworthiness of their contribution may be judged in that context.

The identification of the predictive profile element, such as a tag, may be based on a comparison with a threshold amount associated with the tag. A threshold amount associated with the tag may be determined. A threshold amount associated with the tag may include a threshold amount of assignments and/or instances of a similar and/or substantially identical tag among the profiles associated with other users and/or the contributions of the other users. The threshold amount may be an amount of assignment and/or instances of tags at or beyond which it is determined that the tag is not predictive of an identity of an associated user. The threshold determination may be a pre-determination based on the following relationship: the higher the number of assignments and/or instances of a tag in the security information sharing platform, the less likely that a single assignment and/or instance of the tag is unique enough to be predictive of an identity of a user associated with the tagged contribution. The threshold amount may be an amount of assignment and/or instances of a tag below which it is determined that the tag is predictive of the identity of an associated user. The threshold determination may be a pre-determination based on the following relationship: the lower the number of assignments and/or instances of a tag in the security information sharing platform, the more likely that a single assignment and/or instance of the tag is unique enough to be predictive of an identity a user associated with the tagged contribution. For example, if only a single instance of the tag exists in the platform and the tag is assigned to a single profile of a user and/or solely to the contributions of that user, then the tag is highly predictive of the identity of the user. Therefore, when an amount of assignments and/or instances of a tag among the set of profiles of and/or contributions to the security information sharing platform falls below the threshold amount, the tag may be identified as a profile element that is predictive of the identity of a user associated with the tag.

Not only may identifying the profile element be based on an amount of profiles in the security sharing platform that include a similar and/or substantially identical profile element, but it may additionally be based on an amount of a representative population outside of the security information sharing platform that possess a skill corresponding to the profile element. For example, a particular skill and/or achievement of a performance objective may be relatively uncommon in the security information sharing platform. In another example, a community and/or sub-community of the platform may be relatively small. In both of these examples, it may be desired to consider the prevalence of the skill and/or achievement of the performance objective outside of the security information sharing platform. A representative population may be a population that includes people, businesses, organizations, etc. that are similar in profession, filed, specialty, technology area to a portion of the users of the security information sharing platform. For example, if only a few junior level information technology (IT) security specialist within the security information sharing platform possess a particular skill and/or have achieved a particular performance objective the profile element corresponding to this skill or achievement may be determined to be predictive of a user associated with the profile. However, if the same skill and/or achievement of the same performance objectives is relatively common among junior level information technology (IT) security specialists across the IT industry, then these additional junior level IT security specialists can be counted among the amount of users possessing the profile element corresponding to the skill and/or performance objective achievement. In this manner, a profile element may avoid being identified as predictive of an identity of an associated user despite being relatively rare and/or unique within the security information sharing platform based on its prevalence among a representative community at large. Such a determination may be made possible by the anonymous nature of the profiles and/or contributions within the security information sharing platform. The anonymity allows the plurality of users to assume that, regardless of possessing a unique profile element among the users of the platform, an identity of the user cannot be predicted because of the relatively high prevalence of the skills and/or performance objective achievement among a representative population to which the user belongs.

Provide engine 123 may provide information about the identified profile element to the user of the particular profile. Providing information about the identified profile element may include providing a warming to the user that a profile element of the particular profile that they are associated with is predictive of the user's identity.

Providing information about the identified profile element may include providing the user a recommendation of a profile element substitute that may obfuscate the identity of the user. A substitute profile element that may obfuscate the identity of the user may be a profile element and/or group of profile elements that are more prevalent in the security information sharing platform than the identified profile element. The substitute profile elements may be a profile element and/or group of profile elements that appear in amounts exceeding a threshold past which profile elements are determined to not be predictive of a user's identity.

The privacy preservation system 110 may determine the recommendation of the profile element substitute based on a number of factors. The recommendation may be based on a relevance of a particular profile element in a particular context. For example, the profile element may be a tag associated with an anonymous contribution to the security information sharing platform from a user associated with the profile. The particular context can be the appearance of the tag on a user contribution to a malware query in the security information sharing platform. The profile associated with the user making the contribution may include a "Malware Expert Level 4" badge and a "Forensics Expert" badge, the combination of which is substantially unique in the security information sharing platform and is predictive of the identity of the user associated with the profile. In such an example, the recommendation may include a recommendation to utilize a "Malware Expert Level 4" tag associated with the profile, but to leave off the "Forensics Expert" tag as it is irrelevant in the context of contributing to a malware query and masking it masks the prediction of the user's identity.

The privacy preservation system 110 may determine the recommendation based on selection of a subordinate profile element from a semi-ordered set of profile elements such as badges and their corresponding tags where the ordering relation is defined as follows: "Badge X<Badge Y" if an only if possessing Badge Y implies that you hold Badge X. For example, the profile element may be a tag associated with an anonymous contribution to the security information sharing platform from a user associated with a profile. The profile associated with the user making the contribution may include a "Malware Expert Level 4," which means that the profile also includes "Malware Expert Level 3." The "Malware Expert Level 4" badge, independently or in combination with other badges in the profile, may be predictive of the user's identity, whereas the subordinate "Malware Expert Level 3" badge may not be. The recommendation may include a recommendation of utilizing a tag corresponding to the "Malware Expert Level 3" badge instead of the "Malware Expert Level 4" badge. In another example, the "Malware Expert Level 4" badge may be more predictive of the identity of the user than the "Malware Expert Level 3" badge. In such an example, a threshold tag level associated with the contribution may be determined and if a tag corresponding to the "Malware Expert Level 3" badge meets the threshold, then it may be recommended for the tag over the tag corresponding to "Malware Expert Level 4."

A user may express a preference in response to the provided information. The privacy preservation system 110 may receive (e.g., via an electronic selection from a group of options, via an electronic selection from a group of recommendations, via a preference setting, via an electronic confirmation, etc.) a preference, from the user, to mask the profile element identified as predictive of their identity. Masking the profile element may include hiding the profile element from public visibility and/or prohibit or delay the publicizing of the assignment of the profile element to a particular profile associated with the user. In this manner, some profile elements may be private (not visible to other users) and some profile elements may be public (visible to other users as a badge in a profile and/or as a tag on an anonymous contribution). Masking the profile element may also include utilizing a substitute profile element for public display. Alternatively, the privacy preservation system 110 may receive, from the user, a preference to override a mask of the profile element identified as predictive of their identity. Overriding a mask may include displaying the profile element publically and/or publicizing an assignment of the profile element to a particular profile associated with the user. A user may elect to override a mask in a situation where the user is willing to risk leakage of his identity.

In performing their respective functions, engines 121-123 may access data storage 129 and/or other suitable database(s). Data storage 129 may represent any memory accessible to privacy preservation system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Privacy preservation system 110 may access data storage 129 locally or remotely via network 50 or other networks Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
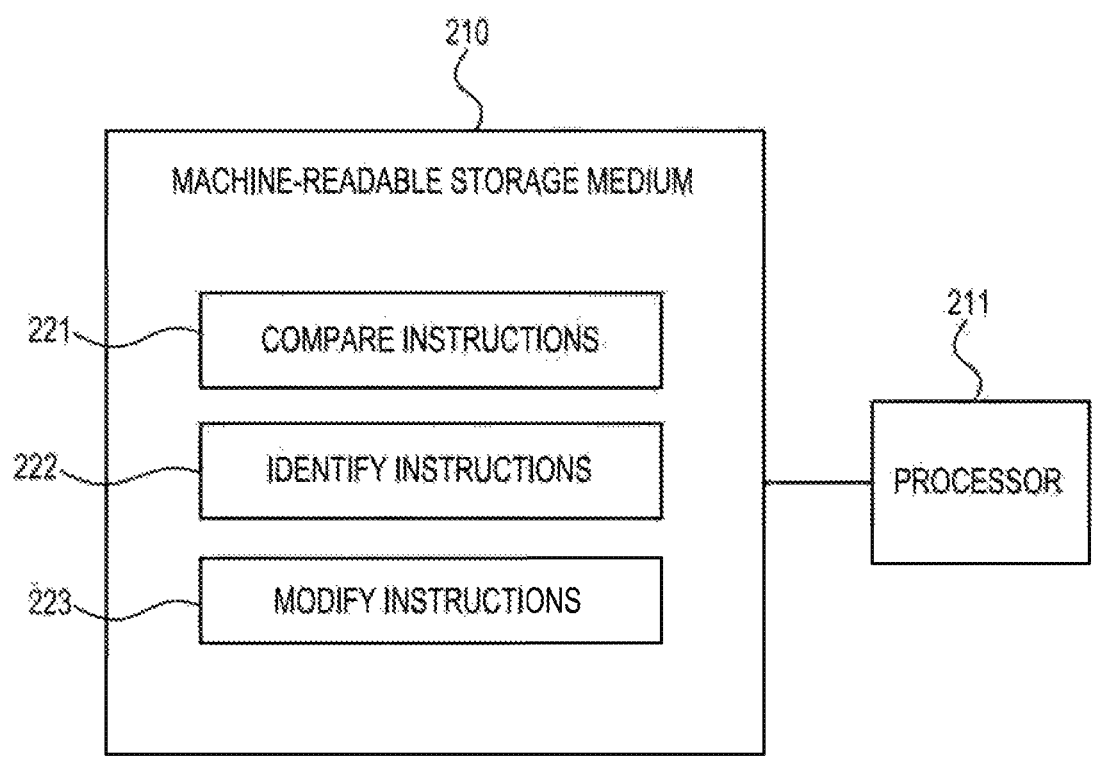
FIG. 2 is a block diagram depicting an example machine-readable storage medium comprising instructions executable by a processor for privacy preservation in a security information sharing platform.

FIG. 2 is a block diagram depicting an example machine-readable storage medium 210 comprising instructions executable by a processor 211 for privacy preservation in a security information sharing platform.

In the foregoing discussion, engines 121-123 were described as combinations of hardware and programming. Engines 121-123 may be implemented in a number of fashions. Referring to FIG. 2, the programming may be processor executable instructions 221-223 stored on a machine-readable storage medium 210 and the hardware may include a processor 211 for executing those instructions. Thus, machine-readable storage medium 210 may be said to store program instructions or code that, when executed by processor 211, implements privacy preservation system 110 of FIG. 1.

In FIG. 2, the executable program instructions in machine-readable storage medium 210 are depicted as compare instructions 221, identify instructions 222, and modify instructions 223. Instructions 221-223 represent program instructions that, when executed, cause processor 211 to implement engines 121, 122, and 123, respectively.

Machine-readable storage medium 210 may be any electronic, magnetic, optical, or other physical storage device that contains or stores executable instructions. In some implementations, machine-readable storage medium 210 may be a non-transitory storage medium, where the term "non-transitory" does not encompass transitory propagating signals. Machine-readable storage medium 210 may be implemented in a single device or distributed across devices. Likewise, processor 211 may represent any number of processors capable of executing instructions stored by machine-readable storage medium 210. Processor 211 may be integrated in a single device or distributed across devices. Further, machine-readable storage medium 210 may be fully or partially integrated in the same device as processor 211, or it may be separate but accessible to that device and processor 211.

In one example, the program instructions may be part of an installation package that when installed can be executed by processor 211 to implement privacy preservation system 110. In this case, machine-readable storage medium 210 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 210 may include a hard disk, optical disk, tapes, solid state drives, RAM, ROM, EEPROM, or the like.

Processor 211 may be at least one central processing unit (CPU), microprocessor, and/or other hardware device suitable for retrieval and execution of instructions stored in machine-readable storage medium 210. Processor 211 may fetch, decode, and execute program instructions 221, 222, and 223, and/or other instructions. As an alternative or in addition to retrieving and executing instructions, processor 211 may include at least one electronic circuit comprising a number of electronic components for performing the functionality of at least one of instructions 221, 222, and 223, and/or other instructions.

Compare instructions 221 may, when executed, cause processor 211 to compare, in a security information sharing platform that enables sharing of security information among a plurality of users, a set of profiles wherein each profile is associated with an individual user. The profiles may include profile elements such as badges and/or tags corresponding to badges. These profile elements may be descriptive of skills of and/or achievement of performance objectives by a user associated with the profile. However, the profile elements are structured to describe these things anonymously. That is the profile elements are not structured to predict an identity of a user.

Identify instructions 222 may, when executed, cause processor 211 to identify, based on the comparison performed with the execution of compare instructions 221, a set of profile elements predicative of an identity of a user associated with a particular profile that the profile elements are associated with. The identification may be based on comparison of an amount of assignments and/or instances of a profile element with a profile element threshold. The profile element threshold may be determined based on an amount of assignments and/or instances of a similar and/or substantially identical profile element among other user profiles. For example, the profile element threshold may be based on the amount of assignments and/or instances of a similar and/or substantially identical profile element among a portion of the user profiles of the security information sharing platform (e.g., all of the user profiles, a community of user profiles, a sub-community of user profiles, etc.). The threshold amount of assignments and/or instances of a similar and/or substantially identical profile element may be an amount below which an instance of the profile element in a profile is indicative of the identity of a user associated with that profile. If the amount of assignments and/or instances of a similar and/or substantially identical profile element is below the threshold amount determined for that portion of the users, then the profile element may be identified as predictive of an identity of a user associated with the particular profile that includes the profile element.

Modify instructions 223 may, when executed, cause processor 211 to modify, based on the identification performed with the execution of identify instructions 222, the set of profile elements of the particular profile in a manner that obfuscates the identity. A modification of a profile element that obfuscates an identity is a modification that makes the profile element and/or the profile less predictive of an identity of a user associated therewith. This may include modifying a set of profile elements such that a resulting publically visible set of profile elements includes a set of profile elements that, individually or in combination, exceed a threshold amount of similar and/or substantially identical profile elements present in other profiles of the security information sharing platform.

Modifying the set of profile elements may include altering a presence of the set of profile elements in a public user profile. A public user profile may be a portion of a profile that is visible to a portion of the other users of the security information sharing platform. Profile elements and/or other information in a public profile may be considered public and accessible to the public. The public profile may include less than all of the profile elements and/or other information included in a non-public portion of the profile. Altering the presence of a set of profile elements in the public profile may include altering the presence of the entire set of profile elements, altering a subset of the set of profile elements, and/or altering a single profile element. Altering the presence of the set of profile elements may include removing profile elements from the public profile, masking profile elements from visibility in the public profile, utilizing substitute profile elements in the public profile, adding a profile element to the public profile, etc.

Modifying the set of profile elements may also include altering a presence of the set of profile elements in a tag associated with an anonymous contribution by the user to the security information sharing platform. As described above, anonymous user contributions to the platform may be tagged with tags corresponding to profile elements such as badges. Altering the presence of these tags may include altering the presence of an entire set of tags, altering a subset of the set of tags, and/or altering a single tag. Altering the presence of these tags may include removing tags from association with a publically visible contribution, masking tags from association with a publically visible contribution, utilizing substitute tags in association with a publically visible contribution, adding a tag to a publically visible contribution, etc.

Modifying the set of profile elements may include generating aggregate profile elements. Generating an aggregate profile element may include aggregating a set of profile elements into a score quantifying performance objective achievement corresponding to a category of profile elements (e.g., a subset of profile elements related in some way such as the same technical discipline, etc.). For example, badges that represent achievement of specific performance objectives such as a number of cases closed in a time frame or identifying a type of malware, may be transformed into an aggregate score such as: Malware Achievement 42%, Xfil (Data Exfiltration) Achievement 76%.

Further, generating an aggregate profile element may include generating a relative measure and/or abstract ranking for the profile based on the profile elements. For example, a set of profile elements may be transformed into a score quantifying achievement of performance objectives relative to the plurality of user of the security information sharing platform (e.g., among the top 10% of malware individuals).

Another example of modifying the set of profile elements may include introducing "noise" into the profile element composition of profiles. Introducing noise may include distorting the prevalence of a particular profile element or pattern of profile elements within the security information sharing platform. Distorting the prevalence of a particular profile element may include artificially increasing the prevalence, artificially decreasing the prevalence (e.g., via random masking), and/or utilizing fake profile elements. Some low level badges (e.g., badges associated with achieving performance objectives that may be relatively easily and commonly achieved) may be made more common among the plurality of profiles in the security information sharing platform. If enough of the plurality of profiles include the low level badge, any public profile may be assigned the badge and/or any anonymous contribution may be tagged with a corresponding tag (or some random portion of the plurality of profiles may have the badge and/or tag hidden from public visibility). Such manipulation of the assignment and visibility of the low level badges may not impact the trustworthiness of the profile and/or the contribution. But the manipulation of the assignment and/or visibility of low level badges may introduce randomness by noise in the security information sharing platform.

Another noise introducing technique may include the assignment and/or public display of fake badges and/or tags. Fake badges and/or tags may include badges and/or tags assigned to a particular profile and/or utilized to tag an anonymous user contribution without the user achieving a performance objective corresponding to the badge and/or tags. The noise introducing techniques may eliminate the ability to distinguish among users utilizing low level badges/ tags and/or badges/tags corresponding to fake badges and/or tags.

Figure 3:
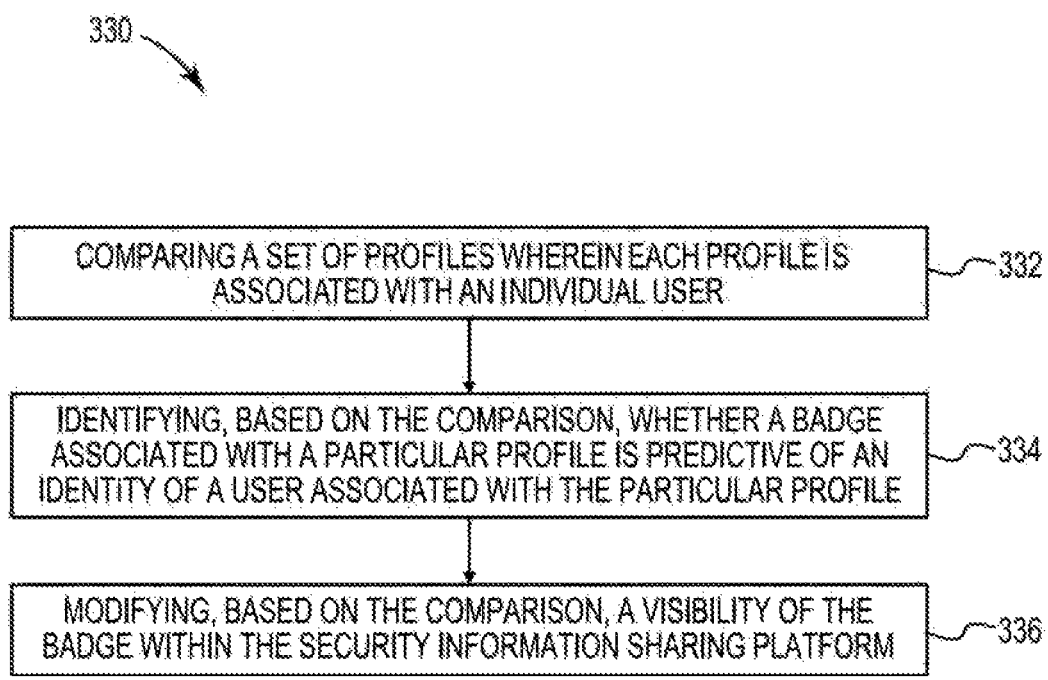
FIG. 3 is a flow diagram depicting an example method for privacy preservation in a security information sharing platform.

FIG. 3 is a flow diagram depicting an example method for privacy preservation in a security information sharing platform. The various processing blocks and/or data flows depicted in FIG. 3 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 330 as illustrated (and described in greater detail below) is meant be an example and, as such, should not be viewed as limiting. Method 330 may be implemented in the form of executable instructions stored on a machine-readable storage medium (e.g., machine-readable storage medium 210, previously described in connection with FIG. 2), and/or in the form of electronic circuitry.

As illustrated at 332, the method 330 may include comparing a set of profiles in a security information sharing platform that enables sharing of security information among a plurality of users. Each profile of the set of profiles may be associated with an individual user of the security information sharing platform.

As illustrated at 334, the method 330 may include identifying, based on the aforementioned comparison, whether a badge associated with a particular profile is predictive of an identity of a user associated with the particular profile. Identifying whether the badge associated with the particular profile is predictive of the user's identity may include determining an amount of users that have achieved a performance objective corresponding to the badge and/or a tag. The determined amount of users may then be compared to a threshold amount of users having achieved the performance objective corresponding to the badge and/or tag. If the determined amount is greater than the threshold amount, then the badge may not be identified as predictive of the user's identity as the badge and/or tag is relatively prevalent in the platform. If the determined amount is less than the threshold amount, then the badge may be identified as predictive of the user's identity since the assignment and/or instance of the badge and/or tag is relatively uncommon in the platform.

Identifying whether the badge associated with the particular profile is predictive of the user's identity may include determining an amount of other badges and/or corresponding tags that have been assigned to the particular profile. The determined amount of other badges and/or tags assigned to the particular profile may be compared to a threshold amount of other badges and/or tags. If the determined amount of other badges and/or tags assigned to the particular profile is greater than the threshold, then the badge may not be identified as predictive of the user's identity as the badge and/or tag is only one among a plurality of other badges and/or tags. If the determined amount of other badges and/or tags assigned to the particular profile is less than the threshold amount, then the badge may be identified as predictive of the user's identity since the badge is one of relatively few other badges and/or tags.

Identifying whether the badge associated with the particular profile is predictive of the user's identity may include determining an amount of instances of performance objective achievement corresponding to the badge that have occurred within the security information sharing platform. For example, identifying whether the badge associated with the particular profile is predictive of the user's identity may include analyzing a portion of all the instances (e.g., cases, contributions, information shares, etc.) within the security information sharing platform and identifying which of those instances correspond to achieve of a performance objective associated with a badge and/or tag. The amount of instances in the platform correspond to achieving a performance objective associated with a badge and/or tag may be compared to a threshold amount of instances. For example, an "APT Expert" badge may be identified as predictive of a user's identity if fewer than a threshold amount of APT incidents has been discussed within the system. By determining an amount of incidents in the security information sharing platform which are associated with an achievement of a performance objective, it may be determined how many potential badges of a particular type may exist in the platform.

As illustrated at 336, the method 330 may include modifying, based on the comparison, a visibility of the badge within the security information sharing platform. Modifying the visibility of a badge may include modifying is ability to been seen and/or accessed by other users of the plurality of users of the security information sharing platform. Modifying the visibility of the badge may include modifying a tag, corresponding to the badge, associated with an anonymous contribution by the user to the security information sharing platform in a manner that obfuscates the identity of the user. Modifying the visibility of the badge may also include modifying a portion of the particular profile observable by the plurality of users.

Modifying the visibility of the badge may include publicizing (e.g., rendering observable, rendering accessible, providing an update, posting a message, etc.) the badge. The badge may be publicized at a predetermined interval (e.g., monthly, weekly, quarterly, etc.) rather than immediately at an achievement of a performance objective corresponding to the badge. By delaying and/or synchronizing the publicizing of badges, privacy may be preserved. The timing of a publicizing of a badge may be predictive of an identity of a user associate therewith. For example, when a user transitions from a badge level N to a badge level N+1, that may indicate that an action (e.g., achievement of a performance objective such as submission of a security incident) may have happened to elevate the badge level. By instead publicizing the badges on regular intervals, the ability to predict the action by the timing of the publicizing may be eliminated.

Modifying the visibility of the badge may include publicizing the badge responsive to determining that a threshold amount of users has achieved a performance objective corresponding to the badge instead of immediately at an achievement of the performance objective. Modifying the visibility of the badge may also include publicizing the badge responsive to a determination that a threshold amount of badges has been assigned to the particular profile that the badge is associated with. Modifying the visibility of the badge may include publicizing the badge responsive to determining that a threshold amount of instances of performance objective achievement corresponding to the badge have occurred within the security information sharing platform. For example, a badge may be publicized responsive to a determination that the achievement of the performance objectives associated with the badge may have plausibly arisen from at least a threshold amount of instances that have occurred in the security information sharing platform.

The foregoing disclosure describes a number of example implementations for privacy preservation in a security information sharing platform. The disclosed examples may include systems, devices, computer-readable storage media, and methods for privacy preservation in a security information sharing platform. For purposes of explanation, certain examples are described with reference to the components illustrated in FIGS. 1-3. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method of privacy preservation in a security information sharing platform, the method comprising:
   comparing, by a system comprising a hardware processor in the security information sharing platform that enables sharing of security information among a plurality of users, a set of profiles wherein each profile of the set of profiles is associated with an individual user;
   identifying, by the system based on the comparing, that a badge associated with a particular profile of the set of profiles is predictive of an identity of the individual user, the badge based on a contribution of security information by the individual user to the security information sharing platform, and the badge comprising user attributes associated with the individual user; and
   modifying, by the system based on the identifying, a visibility of the badge within the security information sharing platform, wherein the modifying of the visibility of the badge comprises publicizing the badge responsive to:
      determining that a threshold amount of users achieved a performance objective corresponding to the badge, or
      determining that a threshold amount of instances of performance objective achievement corresponding to the badge have occurred within the security information sharing platform.

2. The method of claim 1, wherein the modifying of the visibility of the badge comprises at least one of:
   modifying a tag, corresponding to the badge, associated with an anonymous contribution by the individual user to the security information sharing platform in a manner that obfuscates the identity of the individual user; or
   modifying a portion of the particular profile observable by the plurality of users.

3. The method of claim 1, wherein the modifying of the visibility of the badge comprises publicizing the badge at a predetermined interval rather than at an achievement of the performance objective corresponding to the badge.

4. The method of claim 1, wherein the modifying of the visibility of the badge comprises publicizing the badge responsive to determining that a threshold amount of badges have been assigned to the particular profile.

5. The method of claim 1, wherein the user attributes of the badge comprise information of an expertise of the individual user.

6. The method of claim 1, wherein the user attributes of the badge comprise information of a seniority of the individual user.

7. The method of claim 1, wherein the security information contributed by the individual user comprises one or more of a malware sample, information of an attack campaign, a network address, a domain name, or an email address.

8. A non-transitory machine-readable medium comprising instructions that upon execution cause a system to:
   compare, in a security information sharing platform that enables sharing of security information among a plurality of users, a set of profiles wherein each profile of the set of profiles is associated with an individual user;
   identify, based on the comparison, a set of profile elements predictive of an identity of the individual user, the set of profiles elements being part of a particular profile of the set of profiles, the set of profile elements comprising a badge assigned to the individual user based on a contribution of security information by the individual user to the security information sharing platform, and the badge comprising user attributes associated with the individual user; and
   modify, based on the identification, a visibility of the set of profile elements in a manner that obfuscates the identity, the modifying of the visibility of the set of profile elements comprising publicizing the badge responsive to determining that a threshold amount of badges have been assigned to the particular profile.

9. The non-transitory machine-readable medium of claim 8, comprising instructions to modify the visibility of the set of profile elements by altering a presence of the set of profile elements in a public user profile.

10. The non-transitory machine-readable medium of claim 8, further comprising instructions to modify the visibility of the set of profile elements by altering a presence of the set of profile elements in a tag associated with an anonymous contribution by the individual user to the security information sharing platform.

11. The non-transitory machine-readable medium of claim 8, comprising instructions to modify the visibility of the set of profile elements by aggregating the set of profile elements into a score quantifying performance objective achievement corresponding to a category of profile elements.

12. The non-transitory machine-readable medium of claim 8, further comprising instructions to modify the particular profile by assigning a badge to the particular profile without the individual user achieving a performance objective corresponding to the badge.

13. The non-transitory machine-readable medium of claim 8, wherein the publicizing of the badge occurs at a predetermined interval rather than at an achievement of a performance objective corresponding to the badge.

14. The non-transitory machine-readable medium of claim 8, wherein the user attributes of the badge comprise information of one or more of an expertise or a seniority of the individual user.

15. The non-transitory machine-readable medium of claim 8, wherein the security information contributed by the individual user comprises one or more of a malware sample, information of an attack campaign, a network address, a domain name, or an email address.

16. A system for privacy preservation in a security information sharing platform, comprising:
   a physical processor; and
   a non-transitory storage medium storing instructions executable on the physical processor to:
      compare, in the security information sharing platform that enables sharing of security information among a plurality of users, a set of profiles wherein each profile of the set of profiles is associated with an individual user;
      identify, based on the comparison, that a profile element of a particular profile of the set of profiles is predictive of an identity of the individual user, wherein the identification of the profile element is based on an amount of profiles in the security information sharing platform that include the profile element being below a threshold amount; and
      provide information about the profile element to the individual user.

17. The system of claim 16, wherein the identification of the profile element is further based on an amount of a representative population outside of the security information sharing platform that possess a skill corresponding to the profile element.

18. The system of claim 16, wherein the information about the profile element includes a recommendation of a tag for an anonymous contribution to the security information sharing platform that obfuscates the identity.

* * * * *